C. BROSSMANN.
FLOAT CONTROLLED BALANCE VALVE.
APPLICATION FILED MAR. 21, 1907.
906,193.
Patented Dec. 8, 1908.
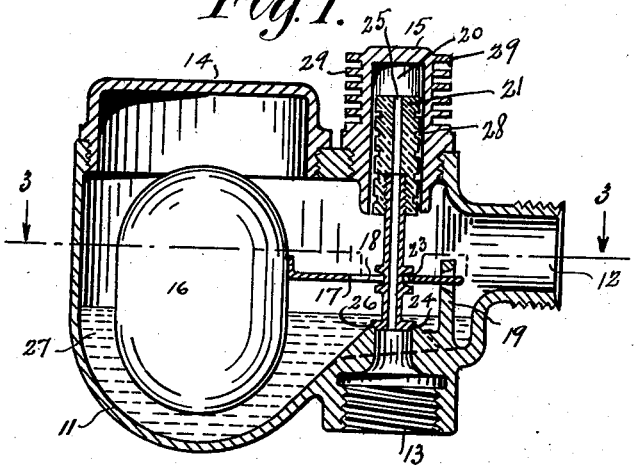
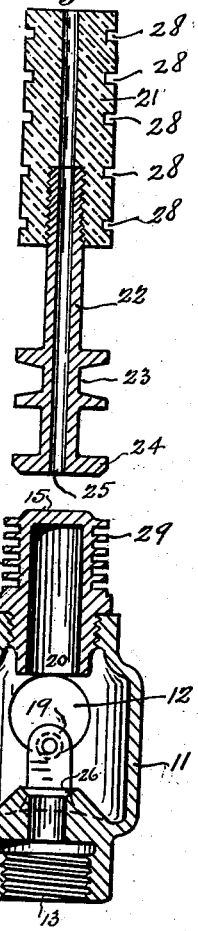
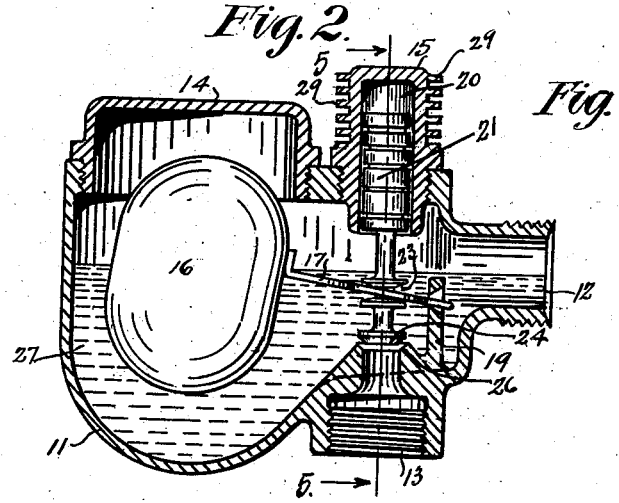
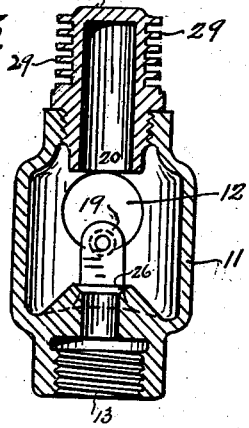
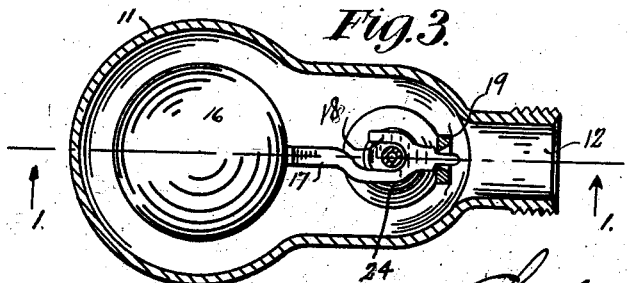
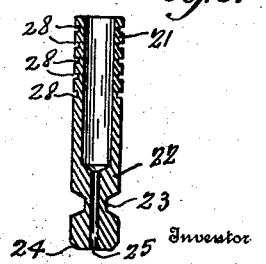

UNITED STATES PATENT OFFICE.

CHARLES BROSSMANN, OF INDIANAPOLIS, INDIANA.

FLOAT-CONTROLLED BALANCE-VALVE.

No. 906,193.

Specification of Letters Patent.

Patented Dec. 8, 1908.

Application filed March 21, 1907. Serial No. 363,554.

*To all whom it may concern:*

Be it known that I, CHARLES BROSSMANN, of Indianapolis, county of Marion, and State of Indiana, have invented a certain new and useful Float-Controlled Balance-Valve; and I do hereby declare that the following is a full, clear, and exact description thereof, reference being had to the accompanying drawings, in which like letters refer to like parts.

My invention relates to improvement in automatic valves or traps, for steam systems or heating systems and particularly to valves for automatically discharging condensed water from radiators of heating systems operating under pressure near or below atmospheric pressure.

One feature of my invention is the use of a balanced valve for discharging the condensed water, the action of such a valve making the operation of the trap positive and reliable.

In the drawings, Figure 1 is a vertical section on the line 1—1 of Fig. 3, showing the valve in a closed position; Fig. 2 is a vertical section on the line 1—1 of Fig. 3, showing the valve in its open position; Fig. 3, is a horizontal section on the line 3—3 of Fig. 1. Fig. 4, is a longitudinal section of the valve; and Fig. 5 is a section on the line 5—5 of Fig. 2, showing the valve removed. Fig. 6 is a modified form of piston and stem.

In detail the device consists of a casing 11, having four threaded openings. The opening 12 is threaded for connection with the radiator or other receptacle containing steam. The opening 13 is threaded to receive the discharge pipe for the condensed water. The other openings are at the top and are closed by the caps 14 and 15 and are for the purpose of rendering the interior accessible for assembling the trap.

Inside the casing there is a float 16 rigid on the lever 17. Said lever is slotted at 18 for the purpose of assembling the trap and loosely fulcruming on the post 19. The cap 15 has a cylinder-like chamber 20 bored to fit more or less accurately the piston 21.

The balanced valve shown in section at Fig. 5 comprises a stem 22 having near its center an annular groove 23 while at its lower end there is a bevel seat valve 24. The upper end of the valve stem 22 is externally threaded to screw into the piston 21. A hole 25 is provided through the stem 22 and piston 21 forming a connection between the chamber 20 and the discharge outlets 13. The piston 21 is preferably made of a material differing in expansion from the cap 15 and while cool there is left between the two slight space for the passage of air from the chamber 12 to the chamber 20. The cap projects into the outside air; therefore, after the air has escaped the steam expands the piston relatively to the cap and thus the escape of the steam is prevented. The casing 11 has in its lower part and directly above the outlet 13 a valve seat 26 accurately ground to fit the bevel valve 24, making the joint between them tight when the stem 22 is in its closed position. The slot 18 is provided in order that the lever 17 may be placed in the annular groove 23 so that a movement of the float 16 will raise the valve 24 vertically from the seat 26.

The operation of the trap is as follows: Steam is turned into the radiator or other receptacle. Such a radiator contains more or less air which immediately begins to discharge from the radiator into the trap, escaping from the trap between the piston 21 and the sides of the chamber 20, until all the air has escaped. In the meantime the steam has been condensed in the radiator and the trap has been partly filled with water 27, as shown in Fig. 1. As soon as the water 27 has reached a level sufficiently high to lift the float 16, the lever 17 raises the stem 22, and the valve 24 is lifted from the seat 26. The float 16 will continue to rise until it has reached the position where the valve 24 is high enough to discharge the water 27 as fast as it condenses in the radiator. This position is indicated in Fig. 2. After the air has all escaped from the radiator the piston 21 expands with the heat of the steam with which it is in contact and more accurately fits the chamber 20, reducing the loss by leakage to a minimum. The steam condensing around the piston fills the grooves 28 therein with water, thus forming a water packing and still further reducing the leakage around the piston. In case of the piston 21 and the cap 15 being made of the same material, the grooves 28 are depended upon entirely to reduce the leakage. When the valve is made in large sizes, spring packing rings can be substituted for the grooves. The cap 15 is provided with radiating ribs 29 on the sides, thus insuring that the cap will always be cooler than the piston and will condense the steam between 15 and 21 and prevent the escape of steam.

The cap 15 being thus kept cooler than piston 21, the expansion will be less in the cap and the piston will fit closer after steam has passed around the piston and condensed.

The piston 21 is made of approximately the same size as the valve 24, by which means the valve may be exactly balanced, so that no power is necessary to operate the valve other than is required to raise the weight of the valve and float. By slightly increasing the area of the piston 21, the weights of the valve and float may be overcome by the pressure in the trap pressing on the bottom of the piston 21. In case the valve is used in a pressure system, or in case of the system operating under a vacuum, the same thing will result from the steam or air being partly exhausted from the chamber 20.

In Fig. 6 there is shown a modified form of the plunger valve and stem that is controlled by the float. All three of said parts are made integral in this form.

What I claim as my invention and desire to secure my Letters Patent is:

1. The combination of a casing with an inlet to receive air and condensation water and an outlet therefor and a condensation chamber over the outlet exposed to the external atmosphere, a vertically operative valve for closing said outlet, a piston operatively connected with said valve and fitting loosely in said condensing chamber so there will be an air outlet passage-way past said piston adapted to be sealed by steam condensation and provided with a vertical passage-way therethrough, and a float for actuating said valve and piston that is controlled by the accumulation of water in said casing.

2. The combination of a casing with an inlet tube to receive steam, air and condensation water and an outlet for the water, a balanced valve mechanism including a piston externally located always above the water in said casing, a cap in which said piston fits so as to form a chamber in said cap at one end of said piston that is of lower pressure than the chamber at the other end of the piston, whereby the cap and piston will be subjected to different temperatures and degrees of expansion to form an air passageway when the piston is cool and to close it when the piston is warm, and a float for actuating said valve mechanism.

3. The combination of a casing with an inlet tube to receive steam, air and condensation water and an outlet for the water, a balanced valve mechanism including a peripherally grooved piston externally located always above the water in said casing, a cap in which said piston fits so as to form a chamber in said cap at one end of said piston that is of lower pressure than the chamber at the other end of the piston, whereby the cap and piston will be subjected to different temperatures and degrees of expansion to form an air passageway when the piston is cool and to close it when the piston is warm, and a float for actuating said valve mechanism.

4. The combination of a casing with an inlet tube to receive steam, air and condensation water and an outlet for the water, a balanced valve mechanism including a peripherally grooved piston externally located and always above the water in said casing, a peripherally ribbed cap in which said piston fits so as to form a chamber in said cap at one end of said piston that is of lower pressure than the chamber at the other end of the piston, whereby the cap and piston will be subjected to different temperatures and degrees of expansion to form an air passage way when the piston is cool and to close it when the piston is warm, and a float for actuating said valve mechanism.

In witness whereof, I have hereunto affixed my signature in the presence of the witnesses herein named.

CHARLES BROSSMANN.

Witnesses:
N. ALLEMONG.
OLIVE BREEDEN.